(12) United States Patent
He et al.

(10) Patent No.: US 10,737,552 B2
(45) Date of Patent: *Aug. 11, 2020

(54) VAPOR INJECTION HEAT PUMP AND CONTROL METHOD

(71) Applicant: FORD GLOBAL TECHNOLOGIES, LLC, Dearborn, MI (US)

(72) Inventors: Jing He, Novi, MI (US); Loren John Lohmeyer, III, Monroe, MI (US); Manfred Koberstein, Troy, MI (US); William Stewart Johnston, South Lyon, MI (US); Angelo Patti, Pleasant Ridge, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,043

(22) Filed: Oct. 9, 2019

(65) Prior Publication Data

US 2020/0039323 A1    Feb. 6, 2020

Related U.S. Application Data

(63) Continuation-in-part of application No. 15/801,965, filed on Nov. 2, 2017, now Pat. No. 10,465,952.

(51) Int. Cl.
*B60H 1/00*  (2006.01)
*F25B 41/04*  (2006.01)
*F25B 30/02*  (2006.01)

(52) U.S. Cl.
CPC ......... *B60H 1/00899* (2013.01); *F25B 30/02* (2013.01); *F25B 41/04* (2013.01); *F25B 2600/2513* (2013.01)

(58) Field of Classification Search
CPC ...... B60H 1/00899; F25B 30/02; F25B 41/04; F25B 2600/2513; F25B 5/04; F25B 49/02;
(Continued)

(56) References Cited

U.S. PATENT DOCUMENTS 8,037,710 B2    10/2011  Wu et al.
2005/0120733 A1    6/2005  Healy et al.

FOREIGN PATENT DOCUMENTS

CN    204006788 U    12/2014
EP    2952832 A1    12/2015
(Continued)

OTHER PUBLICATIONS

English machine translation of CN204006788U dated Dec. 10, 2014.
(Continued)

*Primary Examiner* — Emmanuel E Duke
(74) *Attorney, Agent, or Firm* — David Coppiellie; King & Schickli, PLLC

(57) ABSTRACT

A vapor injection heat pump includes a compressor, a first valve directing a refrigerant of the compressor to a first or second heat exchanger dependent upon a mode of operation, an expansion device receiving the refrigerant from at least one of the heat exchangers, a vapor generator receiving an expanded liquid/vapor refrigerant mix from the first expansion device and directing a vapor component to a first input port of the compressor and a liquid component to at least one of the second heat exchanger and a third heat exchanger, via controlling a second valve, a second expansion device, a third expansion device, and a third valve. A second input of the compressor receives an output refrigerant from at least one of the second heat exchanger and the third heat exchanger dependent upon the mode of operation.

20 Claims, 9 Drawing Sheets

(58) Field of Classification Search
CPC .......... F25B 41/003; F25B 13/00; F25B 6/02;
F25B 2400/23; F25B 2400/13; F25B
2341/0662; F25B 2600/2507; F25B
2400/0409; F25B 2339/047; F25B
2309/061; F25B 9/00
See application file for complete search history.

(56) References Cited

FOREIGN PATENT DOCUMENTS

| | | |
|---|---|---|
| KR | 20070022585 A | 2/2007 |
| KR | 20150023090 A | 3/2015 |
| KR | 101637755 B1 | 7/2016 |
| WO | WO2009082405 A1 | 7/2009 |

OTHER PUBLICATIONS

English machine translation of KR20070022585A dated Feb. 27, 2007.
English Machine Translation of KR101637755B1 dated Jul. 7, 2016.
English machine translation of KR20150023090A dated Mar. 5, 2015.
Baek et al.; "Performance Characteristics of a Two-Stage CO2 Heat Pump Water Heater Adopting a Sub-Cooler Vapor Injection Cycle at Various Operating Conditions"; Energy; vol. 77, Dec. 1, 2014; pp. 570-578.
"Prius Prime 6 Mode Climate Control"; MACS 2017 Training Event & Trade Show; pp. 1-58.
"Vapor Injection Heat Pump System"; Air International Thermal Systems; Jul. 17, 2017.

VAPOR INJECTION HEAT PUMP AND CONTROL METHOD

TECHNICAL FIELD

This document relates generally to heat pumps, and more specifically to vapor injection heat pumps.

BACKGROUND

Driven by direct and indirect legislations, electrification will be required for compliance in the future automotive world. For hybrid and electric vehicles, heat pump systems represent a proven solution to extend the driving range of electrified vehicles and hold significant potential in meeting the increasing demands on electrification. Compared to heating methods using high voltage positive temperature coefficient (HV-PTC) heaters or phase-change material (PCM) heat storage, for example, a heat pump system may extend the driving range by up to 30% (FTP drive cycle at −10° C.; supplier data).

Since technological advances allow many electrified vehicles to routinely travel over 200 miles without recharging, the improvement to the driving range afforded these vehicles through utilization of heat pump systems may not, alone, be sufficient to justify the use of these systems. This is particularly true given the fact that most electrified vehicles with heat pump systems are also equipped with HV-PTC heaters as a supplemental heating source in low ambient conditions (e.g., an ambient temperature below approximately a minus seven degrees Celsius (−7° C.). When combined with the required valves, controls, and expansion device(s) required to make the system operate, the overall cost of heat pump systems is greater than desired.

For plug-in hybrid electric vehicles where engine heating is available, some organizations have attempted to eliminate the need for HV-PTC heaters and the like in low ambient conditions utilizing a vapor injection heat pump. However, the vapor injection feature or mode of operation is only activated in a heating mode of operation. In order to overcome these issues, a need exists for such a vapor injection heat pump system that is capable of activation in more modes of operation than just a heating mode (e.g., a cooling mode of operation). Such a design would take full benefits of vapor injection and address degradation performance issues in both high and low ambient conditions, making it a more competitive solution for use in vehicle climate control and thermal management.

SUMMARY OF THE INVENTION

In accordance with the purposes and benefits described herein, a vapor injection heat pump is provided. The vapor injection heat pump may be broadly described as comprising a compressor for compressing a refrigerant that includes at least a first input port, a second input port, and an output port, a first valve directing at least one of a first portion of the refrigerant output by the compressor to a first heat exchanger and a second portion of the refrigerant output by the compressor to a second heat exchanger dependent upon a mode of operation, a first expansion device receiving at least one of the first portion of the refrigerant directed through the first heat exchanger and the second portion of the refrigerant directed through the second heat exchanger, a vapor generator receiving a liquid and vapor refrigerant mix from the first expansion device and directing a vapor component of the liquid and vapor refrigerant mix to the first input port of the compressor and a liquid component of the liquid and vapor refrigerant mix to at least one of the second heat exchanger and a third heat exchanger, via controlling a second valve, dependent upon the mode of operation, wherein the second input of the compressor receives an output refrigerant from at least one of the second heat exchanger and the third heat exchanger dependent upon the mode of operation, a second expansion device downstream of the vapor generator, a third expansion device upstream of the third heat exchanger, a third valve opening or closing the refrigerant flow dependent upon the mode of operation, and a control module for controlling at least the first, second and third valves and the first, second and third expansion devices dependent upon the mode of operation.

In another possible embodiment, the vapor injection heat pump includes an accumulator upstream of the second input port of the compressor receiving the refrigerant output by at least one of the second heat exchanger and the third heat exchanger dependent upon the mode of operation and directing substantially the vapor component of the refrigerant output by at least one of the second heat exchanger and the third heat exchanger to the second input port of the compressor.

In yet another possible embodiment, the vapor injection heat pump includes a fourth valve between the vapor generator and the first input port of the compressor opening or closing the refrigerant flow into the first input port of the compressor.

In still another possible embodiment, the first, second, and third heat exchangers are air-to-refrigerant heat exchangers.

In another possible embodiment, the first valve directs the refrigerant output by the compressor to the second heat exchanger, and the second valve directs the liquid component of the liquid and vapor refrigerant mix to the third heat exchanger, in a cooling mode of operation.

In yet another possible embodiment, the first valve directs the refrigerant output by the compressor to the first heat exchanger, and the second valve closes and the third valve opens to allow the liquid component of the liquid and vapor refrigerant mix to the second heat exchanger via the second expansion device, in a heating mode of operation.

In another possible embodiment, the first valve directs the refrigerant output by the compressor to the first heat exchanger, and the second valve directs the liquid component of the liquid and vapor refrigerant mix first to the second heat exchanger, via the second expansion device, and then to the third heat exchanger, via the third expansion device, in a first reheating mode of operation.

In still yet another possible embodiment, the first valve directs the refrigerant output by the compressor to both the first heat exchanger and the second heat exchanger, and the second valve directs the liquid component of the liquid and vapor refrigerant mix to the third heat exchanger, via the third expansion device, in a second reheating mode of operation.

In another possible embodiment, the first valve directs the refrigerant output by the compressor to the first heat exchanger. The control module operates the first expansion device in an open mode providing minimal refrigerant flow restriction and the second expansion device in an expansion mode lowering pressure and temperature of the refrigerant flow. The control module further closes the second valve and the third expansion device, and opens the third valve. The second heat exchanger receives the expanded refrigerant flow out of the second expansion device and absorbs heat. The third valve directs the cooled refrigerant out of the second heat exchanger to the accumulator and eventually to the second input port of the compressor where the refrigerant is compressed to high-temperature, high-pressure vapor, in a deicing mode of operation.

In one other possible embodiment, the first heat exchanger is a refrigerant-to-coolant heat exchanger.

In another possible embodiment, the heat pump further comprises a coolant loop including the first refrigerant-to-coolant heat exchanger and a fourth air-to-coolant heat exchanger through which a coolant is pumped dependent upon the mode of operation.

In yet another possible embodiment, the heat pump further comprises a refrigerant loop including the compressor, the first valve, the second heat exchanger, the first expansion device, the vapor generator, the second valve, the second expansion device, the third expansion device, the third valve, and the third heat exchanger.

In still another possible embodiment, the first valve directs the refrigerant output by the compressor to the second heat exchanger and the second valve directs the liquid component of the liquid and vapor refrigerant mix to the third heat exchanger, in a cooling mode of operation.

In another possible embodiment, the first valve directs the refrigerant output by the compressor to the first refrigerant-to-coolant heat exchanger, the second valve closes and the third valve opens to allow the liquid component of the liquid and vapor refrigerant mix to the second heat exchanger, and the pump pumps coolant through the first refrigerant-to-coolant heat exchanger and the fourth air-to-coolant heat exchanger within the coolant loop, in a heating mode of operation.

In yet still another possible embodiment, the first valve directs the refrigerant output by the compressor to the first refrigerant-to-coolant heat exchanger, the second valve directs the liquid component of the liquid and vapor refrigerant mix first to the second heat exchanger, via the second expansion device, and then to the third heat exchanger, via the third expansion device, and the pump pumps coolant through the first refrigerant-to-coolant heat exchanger and the fourth air-to-coolant heat exchanger within the coolant loop, in a first reheating mode of operation.

In still another possible embodiment, the first valve directs the refrigerant output by the compressor to both the first refrigerant-to-coolant heat exchanger and the second heat exchanger, the second valve directs the liquid component of the liquid and vapor refrigerant mix to the third heat exchanger, via the third expansion device, and the pump pumps coolant through the first refrigerant-to-coolant heat exchanger and the fourth air-to-coolant heat exchanger within the coolant loop, in a second reheating mode of operation.

In one other possible embodiment, the first valve directs the refrigerant output by the compressor to the first refrigerant-to-coolant heat exchanger. The control module operates the first expansion device in an open mode providing minimal refrigerant flow restriction and the second expansion device in an expansion mode lowering pressure and temperature of the refrigerant flow. The control module further closes the second valve, the third expansion device, and opens the third valve. The second heat exchanger receives the expanded refrigerant flow and absorbs heat. The third valve directs the cooled refrigerant out of the second heat exchanger to the accumulator and eventually to the second input port of the compressor where the refrigerant is compressed to high-temperature, high-pressure vapor, in a deicing mode of operation.

In other possible embodiments, the vapor generator is a separator.

In still other possible embodiments, the vapor generator is a refrigerant-to-refrigerant heat exchanger, the refrigerant-to-refrigerant heat exchanger receiving (1) a first portion of the refrigerant output by the at least one of the first heat exchanger and the second heat exchanger and expanded within the first expansion device to the liquid and vapor refrigerant mix and (2) a second portion of the refrigerant output by the at least one of the first heat exchanger and the second heat exchanger dependent upon the mode of operation. The liquid and vapor refrigerant mix in the first portion is at a lower temperature due to expansion in the first expansion device, absorbs heat from the refrigerant in the second portion, becomes substantially vapor, and is directed to the first input port of the compressor.

In accordance with another possible embodiment, a vapor injection heat pump comprises a compressor for compressing a refrigerant that includes at least a first input port, a second input port, and an output port, a first valve directing the refrigerant output by the compressor, the first valve directing the refrigerant to (1) a first heat exchanger in a heating mode of operation, a first reheating mode of operation, and a deicing mode of operation, to (2) a second heat exchanger in a cooling mode of operation, and to (3) both the first and second heat exchangers in a second reheating mode of operation, a first expansion device receiving the refrigerant directed through the first heat exchanger in the heating mode of operation, the first reheating mode of operation, and the deicing mode of operation, the refrigerant directed through the second heat exchanger in the cooling mode of operation, and the refrigerant directed through both the first and second heat exchangers in the second reheating mode of operation, a vapor generator receiving a liquid and vapor refrigerant mix from the first expansion device and directing a vapor component of the liquid and vapor refrigerant mix to the first input port of the compressor and a liquid component of the liquid and vapor refrigerant mix to at least one of the second heat exchanger and a third heat exchanger, via controlling a second valve, dependent upon the mode of operation, a second expansion device downstream of the vapor generator, a third expansion device upstream of the third heat exchanger, a third valve opening or closing the refrigerant flow dependent upon the mode of operation, wherein a second input of the compressor receives an output refrigerant from at least one of the second heat exchanger and the third heat exchanger dependent upon the mode of operation, and a control module for controlling at least the first, second and third valves and the first, second, and third expansion devices dependent upon the mode of operation.

In the following description, there are shown and described several embodiments of a vapor injection heat pump and related methods of heating and cooling a passenger compartment of a vehicle. As it should be realized, the methods and vapor injection heat pumps are capable of other, different embodiments and their several details are capable of modification in various, obvious aspects all without departing from the methods and vapor injection heat pumps as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vapor injection heat pump and related methods and together with the description serve to explain certain principles thereof. In the drawing figures.

Note that in all Figures, thick lines represent active flow (e.g. valve open) and thin lines represent no flow (e.g. valve closed).

Reference will now be made in detail to the present embodiments of the vapor injection heat pump and related methods of heating and cooling a passenger compartment, examples of which are illustrated in the accompanying drawing figures, wherein like numerals are used to represent like elements.

DETAILED DESCRIPTION

Figure 1:
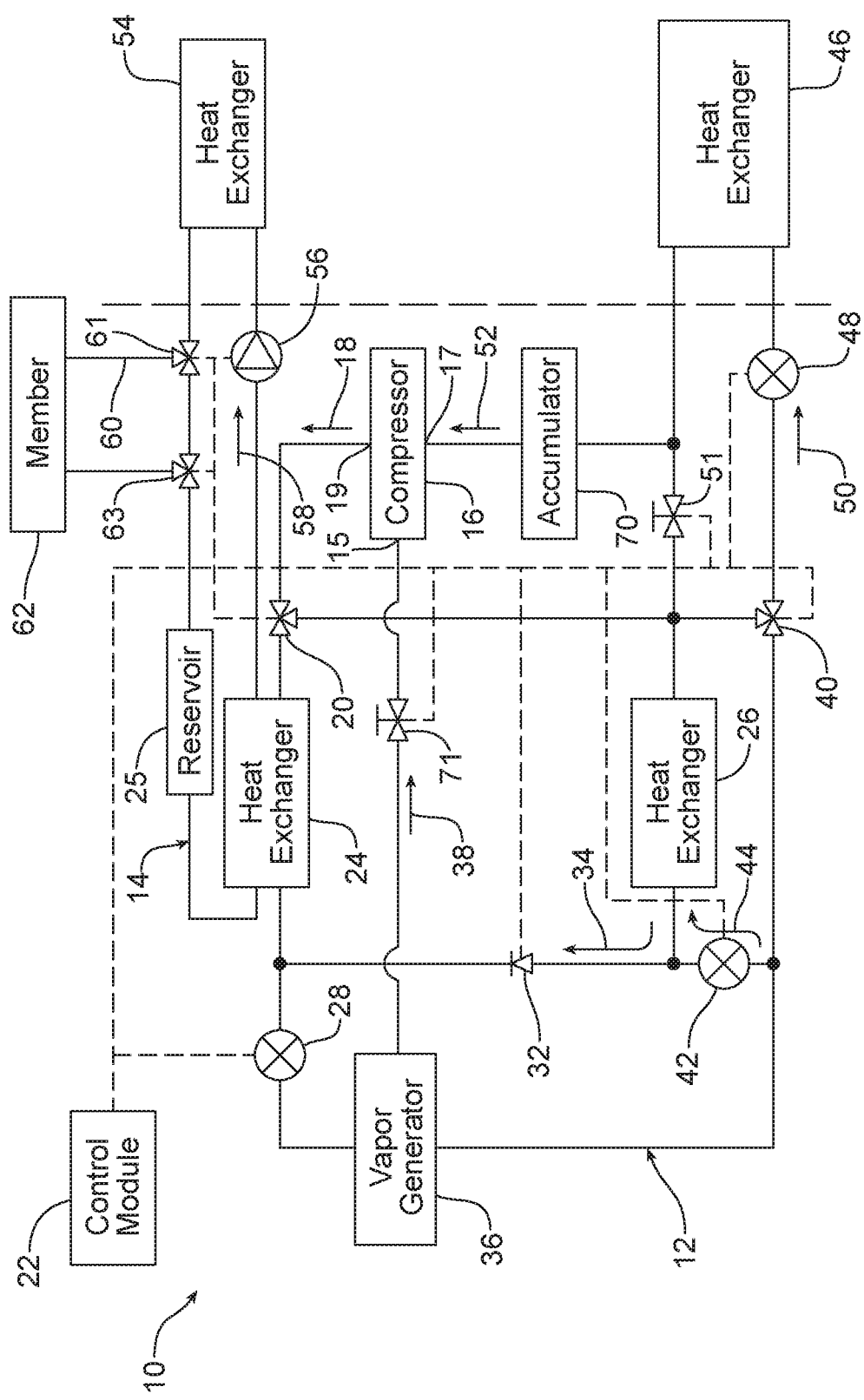
FIG. 1 is a schematic diagram of a vapor injection heat pump having a primary or refrigerant loop and a secondary or coolant loop.

Reference is now made to FIG. 1 which illustrates a schematic diagram of a vapor injection heat pump 10 including a primary loop 12 and a secondary loop 14. While the vapor injection heat pump 10 is operable in any vehicle type, it is considered most suitable for hybrid and electric vehicles. Within the primary or refrigerant loop 12, a fluid (e.g., an R744, R134a or R1234yf refrigerant) in the form of a gas or vapor refrigerant enters a first input port 15 and a second input port 17 of a compressor 16. Within the compressor 16, the refrigerant entering the second input port 17 is compressed from low-pressure stage. The compressed refrigerant is combined with the refrigerant entering the first input port 15 and compressed from intermediate-pressure gas refrigerant into a high-pressure, high-temperature gas refrigerant.

The high temperature, high pressure vapor refrigerant leaves the compressor 16 via a discharge or output port 19 as shown by action arrow 18, and flows into a first valve 20. In the described embodiment, the valve 20 is a three-way valve (one input and two outputs) electrically connected to a control module 22 as shown by dashed line. The valve 20 directs the refrigerant output by the compressor 16 through a first, refrigerant-to-coolant, heat exchanger 24 and/or a second, air-to-refrigerant, heat exchanger 26 dependent upon a mode of operation via a check valve 32, to an expansion device 28. As will be described in more detail below, the second air-to-refrigerant heat exchanger 26 may function as a condenser or an evaporator depending on the mode of operation.

The expansion device 28 has three operating modes, including an open mode providing minimal flow restriction, a closed mode blocking refrigerant flow, and an intermediate open mode causing a certain degree of expansion of refrigerant flow, dependent upon the mode of operation. When operating in the expansion mode, a cooled, high-pressure refrigerant from the refrigerant-to-coolant heat exchanger 24 and/or the second air-to-refrigerant heat exchanger 26 is expanded to become an intermediate-pressure, intermediate-temperature liquid and vapor refrigerant mixture which is supplied to the vapor generator 36. A vapor generator includes any device used to generate a vapor and supply the vapor to one input port of the compressor. For example, vapor generators include a flash tank or a heat exchanger among other known devices. The vapor generator 36 directs, or injects, a vapor component of a liquid and vapor refrigerant mix to the first input port 15 (or intermediate-pressure input port) of the compressor 16 as shown by action arrow 38 in FIG. 1.

Each of the first expansion device 28, the second expansion device 42, and the third expansion device 48 in this embodiment is an electronic expansion device with an adjustable opening size. However, similar functions can be achieved using a fixed orifice tube, or a thermal expansion device, combined with extra valves (not shown). When the expansion device 28 is an electronic expansion device having an opening therein through which the refrigerant passes, as in the described embodiment, regulation of the flow of refrigerant, or throttling, is used to control a temperature of the refrigerant provided to the vapor generator 36. Increasing the pressure drop necessarily lowers the temperature of the refrigerant entering the vapor generator 36. The control module 22 is electrically connected to the expansion device 28 (as shown by dashed line) and operates to control a size of the opening within the expansion device 28 which determines refrigerant status moving through the device.

A liquid component of the liquid and vapor refrigerant mix exiting the vapor generator 36 is directed by a combination of a second valve 40, a second expansion device 42, and a third valve 51 to the second air-to-refrigerant heat exchanger 26, as shown by action arrow 44, or to a third air-to-refrigerant heat exchanger 46 via a third expansion device 48, as shown by action arrow 50, dependent upon the mode of operation. In the described embodiment, the valve 40 is a three-way valve (two inputs and one output) electrically connected to the control module 22 as shown by dashed line.

An accumulator 70 receives low-pressure, low-temperature, mostly vapor, refrigerant exiting the second air-to-refrigerant heat exchanger 26, via the third valve 51, or the third air-to-refrigerant heat exchanger 46, via the second valve 40, or both the second air-to-refrigerant heat exchanger 26 and the third air-to-refrigerant heat exchanger 46, depending on the mode of operation. The accumulator 70 functions to store excessive refrigerant and oil and provide only vapor refrigerant to the compressor 16. In another possible embodiment, the accumulator may not be required when the second expansion device 42 and the third expansion device 48 are thermal expansion devices with calibrated superheat. In the described embodiment, the accumulator 70 provides substantially vapor refrigerant to the second input port (or low-pressure input port) of the compressor 16 as shown by action arrow 52. As described above, the refrigerant entering the second input port 17 is compressed in the low-pressure stage, combined with the refrigerant entering the first input port 15, and compressed in the intermediate-pressure stage into the high-pressure, high-temperature gas refrigerant.

A fourth valve 71 may be equipped between the vapor generator 36 and the first input port 15 of the compressor 16 that either opens to allow refrigerant flow into the first input port of the compressor or closes to block the refrigerant flow into the first input port of the compressor.

As further shown in FIG. 1, the control module 22 is electrically connected to components within the vapor injection heat pump 10 (as shown by dashed lines) in addition to the first valve 20, the second valve 40, the third valve 51, and the first expansion device 28, the second expansion device 42, and the third expansion device 48. One such component is the compressor 16. In the described embodiment, the compressor 16 is an electric, multi-port compressor driven by a variable speed motor (not shown) and the control module 22 adjusts a speed of the motor. Other embodiments may utilize fixed or variable displacement compressors driven by a compressor clutch which in turn is driven by an engine of the vehicle.

Other components connected to the control module 22, in the described embodiment, include each of the valves and expansion devices, whether or not connected to the control module by dashed lines, in the figures. While the described embodiment utilizes a single control module 22 to control the plurality of components within the vapor injection heat pump 10, any of a plurality of control modules connected to a vehicle computer via a controller area network (CAN) bus in the vehicle, as is known in the art, could be utilized to control one or more of the plurality of components of the vapor injection heat pump 10. The control module 22 is responsive to a switch (or other input means) operated by an operator of a vehicle in the described embodiment. The switch (e.g., an air conditioning on/off switch) changes a mode of operation from, for example, a cooling mode to an off mode, a heating mode, or other modes of operation.

As eluded to above, the refrigerant loop 12 interacts with the secondary or coolant loop 14 primarily through heat transfers occurring within the first refrigerant-to-coolant heat exchanger 24. Within the coolant loop 14, control module 22 controls coolant flow through an air-to-coolant heat exchanger 54, a reservoir 25 (e.g., a degas tank), and the refrigerant-to-coolant heat exchanger 24 dependent upon the mode of operation of the vapor injection heat pump 10. As shown in FIG. 1, a pump 56 pumps the coolant through the coolant loop 14, as shown by action arrow 58. The control module 22 controls the pump 56 and necessarily a rate of coolant flow dependent upon the mode of operation and a desired output. It should be noted that the pump 56 may be turned off in certain modes of operation as described below.

In the described embodiment, the coolant loop 14 further includes an auxiliary coolant loop 60 for utilizing heat from at least one component or member 62 (e.g., an engine, electronics, battery pack, one or more heating elements, and/or brakes, etc.). Whether coolant flow exiting the air-to-coolant heat exchanger 54 is directed through the auxiliary coolant loop 60 or not is controlled by an auxiliary loop valves 61 and 63. The valves 61 and 63 operate to bypass the auxiliary coolant loop 60 or direct the coolant flow through the auxiliary coolant loop 60 as directed by the control module 22. The utilization of an auxiliary coolant loop 60, however, is not required in all embodiments while other embodiments may utilize one or more auxiliary coolant loops.

Figure 2:
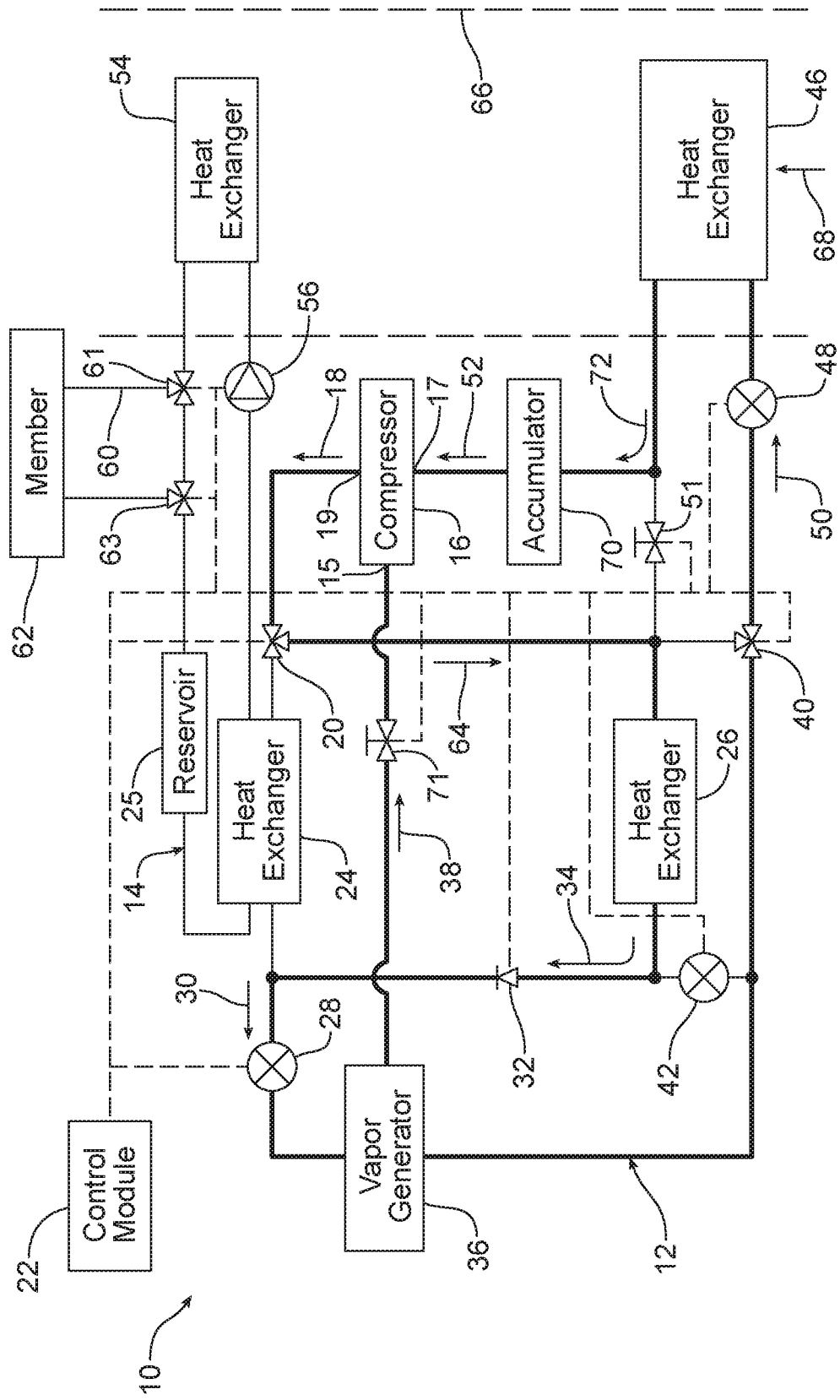
FIG. 2 is a schematic diagram of the vapor injection heat pump operating in a cooling mode.

In a cooling mode of operation, as shown in FIG. 2, the control module 22 signals the valve 20 to direct the flow of the refrigerant to the second air-to-refrigerant heat exchanger 26 as shown by action arrow 64. In this mode of operation, the first, refrigerant-to-coolant, heat exchanger 24 and coolant loop 14 are idle and the second air-to-refrigerant heat exchanger 26 functions as a condenser (or gas cooler). Within the second air-to-refrigerant heat exchanger 26, the high-pressure, high-temperature vapor refrigerant discharged from the compressor 16 is cooled due primarily to the effect of outside air. A fan (not shown) may be utilized to create and regulate a flow of air over the second air-to-refrigerant heat exchanger 26 and a radiator. The cooled, high-pressure refrigerant is then directed through check valve 32 (shown by action arrow 34) to the first expansion device 28 as shown by action arrow 30. In the first expansion device 28, the refrigerant is expanded to become an intermediate-pressure, intermediate-temperature liquid and vapor refrigerant mixture supplied to the vapor generator 36. As described above, the vapor component of the liquid and vapor refrigerant mix is injected into the first input port 15 of the compressor 16 as shown by action arrow 38.

The liquid component of the liquid and vapor refrigerant mix exiting the vapor generator 36 is directed by the valve 40 to the third air-to-refrigerant heat exchanger 46 via the third expansion device 48. In the cooling mode, the third air-to-refrigerant heat exchanger 46 functions as an evaporator as is known in the art. In the described embodiment, the third air-to-refrigerant heat exchanger 46 is positioned within a heating, ventilation, and air conditioning (HVAC) case 66 of a vehicle and used to cool or dehumidify a passenger compartment (not shown).

Warm, moist air flowing across the third air-to-refrigerant heat exchanger 46 (as shown by arrow 68) transfers its heat to the cooler refrigerant within the third air-to-refrigerant heat exchanger. The byproducts are a lowered temperature air and possibly condensation from the air which is routed from the third air-to-refrigerant heat exchanger 46 to an exterior of the vehicle. A blower (not shown) may blow air across the third air-to-refrigerant heat exchanger 46. This process results in the passenger compartment having a cooler, drier air therein.

Within the third air-to-refrigerant heat exchanger 46, the low-pressure, low-temperature liquid and vapor refrigerant mixture boils to vapor, or mostly vapor (with some liquid), due to the heat removed from the air. The resulting low-pressure, low-temperature vapor refrigerant exits the third air-to-refrigerant heat exchanger 46, as shown by action arrow 72, and is received by the accumulator 70. In the described embodiment, the accumulator 70 functions to store excessive refrigerant and oil and provide vapor refrigerant to the second input port 17 of the compressor 16. As described above, the accumulator 70 may not be required in other embodiments, for example when thermal expansion devices are used.

Figure 3:
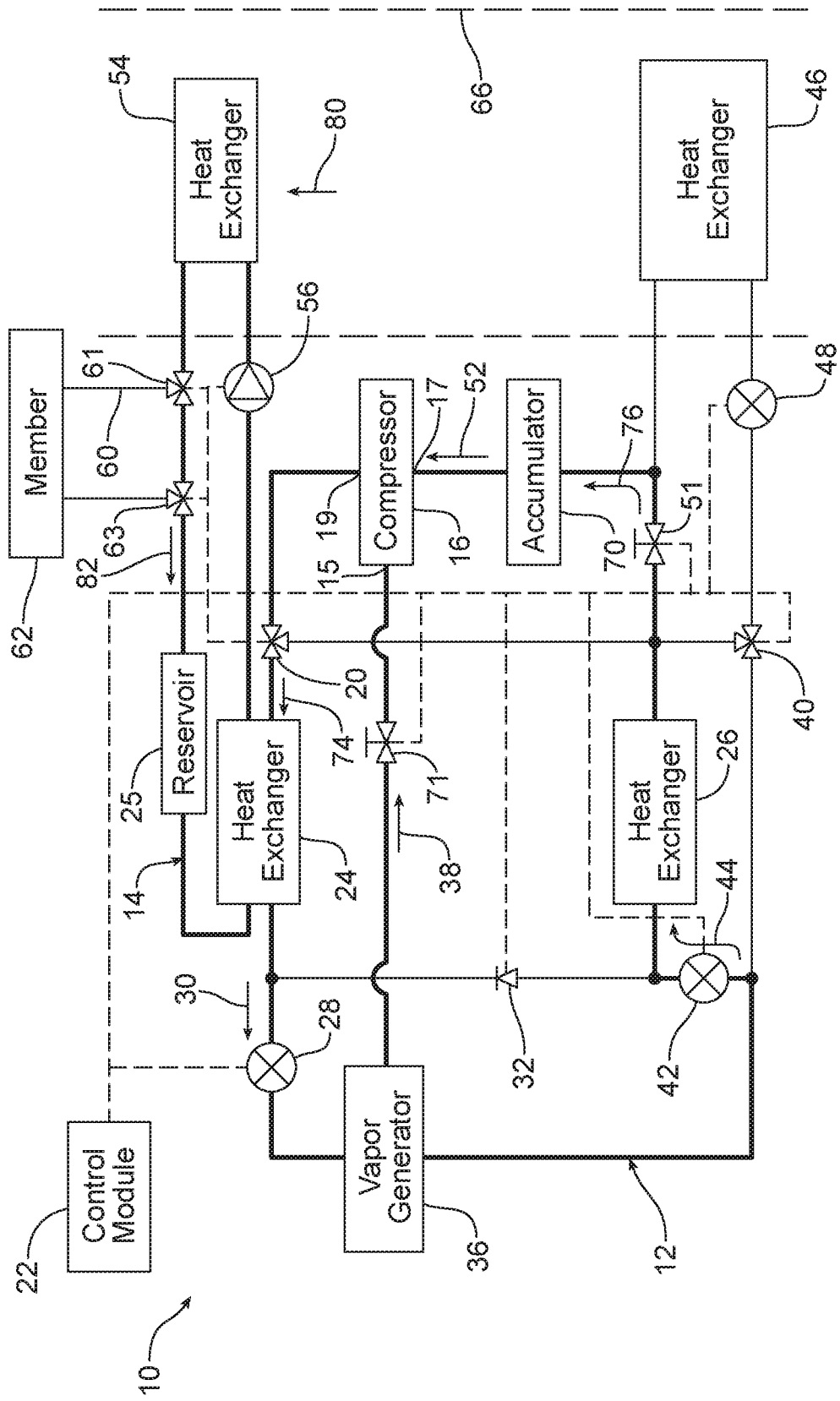
FIG. 3 is a schematic diagram of a vapor injection heat pump operating in a heating mode.

In a heating mode of operation, as shown in FIG. 3, the control module 22 signals the valve 20 to direct the flow of the refrigerant to the first, refrigerant-to-coolant, heat exchanger 24 as shown by action arrow 74. The refrigerant-to-coolant heat exchanger 24 functions as described above to cool the high-pressure, high-temperature vapor refrigerant discharged from the compressor 16. The cooled, high-pressure refrigerant is then sent to the expansion device 28, as shown by action arrow 30, where the refrigerant is expanded to become the intermediate-pressure, intermediate-temperature liquid and vapor refrigerant mixture supplied to the vapor generator 36. The vapor component of the liquid and vapor refrigerant mixture is injected into the first input port 15 of the compressor 16 as shown by action arrow 38.

The liquid component of the liquid and vapor refrigerant mix exiting the vapor generator 36, on the other hand, is directed to the second air-to-refrigerant heat exchanger 26 via the second expansion device 42 by closing the valve 40 and opening the valve 51. In the heating mode, the second air-to-refrigerant heat exchanger 26 functions as an evaporator as is known in the art. In this instance, an intermediate-temperature, intermediate-pressure liquid refrigerant discharged from the vapor generator 36 is expanded within the second expansion device 42 to a low-temperature, low-pressure liquid and vapor refrigerant mix. The low-temperature, low-pressure liquid and vapor refrigerant mix boils to vapor, or mostly vapor (with some liquid), due to heat transferred from warm air flowing across the second air-to-refrigerant heat exchanger 26 to the cooler refrigerant within the second air-to-refrigerant heat exchanger. The low-pressure, low-temperature refrigerant exits the second air-to-refrigerant heat exchanger 26 and is directed by the valve 51 to the accumulator 70, as shown by action arrow 76. The low-pressure, low-temperature refrigerant, substantially in vapor state after the accumulator 70, finally flows to the second input port 17 (or low-pressure input port) of the compressor 16. The third expansion device 48 remains fully closed.

In the described heating mode, the control module 22 directs the pump 56 to pump coolant within the coolant loop 14 through the first, refrigerant-to-coolant, heat exchanger and the fourth, air-to-coolant, heat exchanger 54 which functions as a heater core. As is known in the art, the fourth air-to-coolant heat exchanger 54 is positioned within the HVAC case 66 of the vehicle and is used to warm the passenger compartment. Cold air flowing across the fourth air-to-coolant heat exchanger 54 (as shown by arrow 80) absorbs heat from the warm coolant thereby increasing the temperature of the air. The blower (not shown) blows air across the fourth air-to-coolant heat exchanger 54 and into the passenger compartment. This process results in the passenger compartment having a warmer air therein.

Within the fourth air-to-coolant heat exchanger 54, the warm coolant is cooled due to the heat given to the air and directed back to the first refrigerant-to-coolant heat exchanger 24 (as shown by action arrow 82). In the first refrigerant-to-coolant heat exchanger 24, the cooled coolant is again warmed by absorbing heat from the refrigerant in the refrigerant loop 12, and cycled through the coolant loop 14. In the heating mode of operation, an auxiliary coolant loop 60 may be utilized as a supplemental heat source to further heat the coolant in the manner described above.

As noted above, the control module 22 is electrically connected to the pump 56 and the compressor 16 and controls one or both in varying embodiments to adjust or regulate the heating capacity of the fourth air-to-coolant heat exchanger 54. Increasing the pumping rate raises the coolant flow rate in the coolant loop 14 and increasing the compressor speed raises the refrigerant flow rate in the refrigerant loop 12, thereby increasing heating capacity. The opposite is true when the pumping rate and/or the compressor speed is lowered and heating capacity is decreased.

Figure 4:
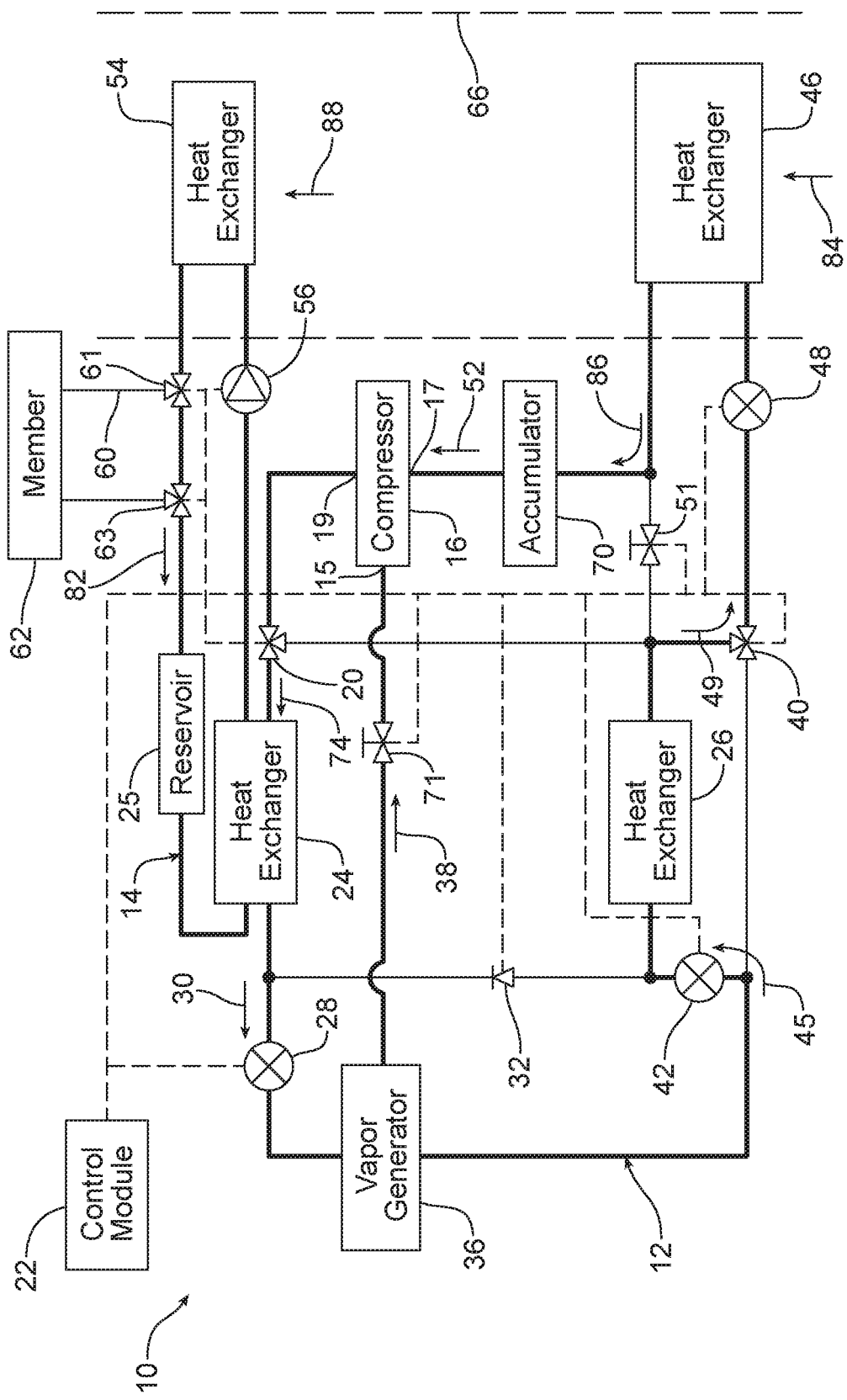
FIG. 4 is a schematic diagram of a vapor injection heat pump operating in a first reheating mode.

In a first reheating mode of operation, as shown in FIG. 4, the control module 22 signals the valve 20 to direct the flow of refrigerant to the first refrigerant-to-coolant heat exchanger 24 as shown by action arrow 74. As in the above-described heating mode, the first refrigerant-to-coolant heat exchanger 24 functions to cool the high-pressure, high-temperature vapor refrigerant discharged from the compressor 16. The cooled, high-pressure refrigerant is received by the expansion device 28, as shown by action arrow 30, where the refrigerant is expanded to become an intermediate-pressure, intermediate-temperature liquid and vapor refrigerant mixture supplied to the vapor generator 36. The vapor component of the liquid and vapor refrigerant mixture is again injected into the first input port 15 of the compressor 16 as shown by action arrow 38.

The liquid component of the liquid and vapor refrigerant mix exiting the vapor generator 36, however, is directed by the valve 40 and closure of the valve 51, first to the second air-to-refrigerant heat exchanger 26, via the second expansion device 42 as shown by action arrow 45, and then to the third air-to-refrigerant heat exchanger 46, via the third expansion device 48 as shown by action arrow 49. As one possible reheating mode of operation, the intermediate-temperature, intermediate-pressure liquid refrigerant discharged from the vapor generator 36 is expanded within the second expansion device 42 to a low-temperature, low-pressure liquid and vapor refrigerant mixture received by the second air-to-refrigerant heat exchanger 26. The third expansion device 48 may operate in an expansion mode to further lower temperature of the refrigerant out of the second air-to-refrigerant heat exchanger 26 or in an open mode to minimize flow restriction and supply to the third air-to-refrigerant heat exchanger 46. The third air-to-refrigerant heat exchanger is used to cool and dehumidify the moist, warm air flowing across the third air-to-refrigerant heat exchanger (shown by action arrow 84). Within the third air-to-refrigerant heat exchanger 46, the now low-pressure, low-temperature liquid and vapor refrigerant mixture boils to vapor, or mostly vapor (with some liquid), due to the heat removed from the air and is directed to the accumulator 70 as shown by action arrow 86.

While the third air-to-refrigerant heat exchanger 46 functions to lower the humidity of the air within the passenger compartment for the comfort of the passengers or to defog one or more of the windows/windshield within the passenger compartment, the air in the passenger compartment is also cooled through this process. In this scenario, it may be desired to re-heat or warm the air in the passenger compartment to ensure the comfort of the passengers. Accordingly, in the dehumidification and reheat mode of operation, warmed coolant within the coolant loop 14 is concurrently pumped through the air-to-coolant heat exchanger 54.

As in the heating mode, the control module 22 directs the pump 56 to pump coolant within the coolant loop 14 through the first refrigerant-to-coolant heat exchanger 24 and the fourth air-to-coolant heat exchanger 54 which functions as a heater core within the HVAC case 66 to heat the cooled, dehumidified air and supply tempered or warm air to the passenger compartment. The cold air flowing across the fourth air-to-coolant heat exchanger 54 (as shown by arrow 88) absorbs heat from the warm coolant thereby increasing the temperature of the air. This process results in the passenger compartment having a warmer air therein.

Within the fourth air-to-coolant heat exchanger 54, the warm coolant is cooled due to the heat given to the air and directed back to the first refrigerant-to-coolant heat exchanger 24 (as shown by action arrow 82). In the first refrigerant-to-coolant heat exchanger 24, the cooled coolant is again warmed by absorbing heat from the refrigerant in the refrigerant loop 12, and cycled through the coolant loop 14. In the dehumidification and reheat mode of operation, an auxiliary coolant loop 60 may be utilized as a supplemental heat source to further heat the coolant in the manner described above.

As described above, the control module 22 may be utilized to control one, or both, of the pump 56 and the compressor 16 in varying embodiments to adjust or regulate the heating capacity of the fourth air-to-coolant heat exchanger 54 and, in certain embodiments, through the auxiliary cooling loop 60. In the dehumidification and reheat mode of operation, varying one or both components may be utilized to adjust a heating capacity of the fourth air-to-coolant heat exchanger 54 allowing the temperature of air flowing into the passenger compartment to be controlled without the need for a blend door or other mechanical means as described above.

Figure 5:
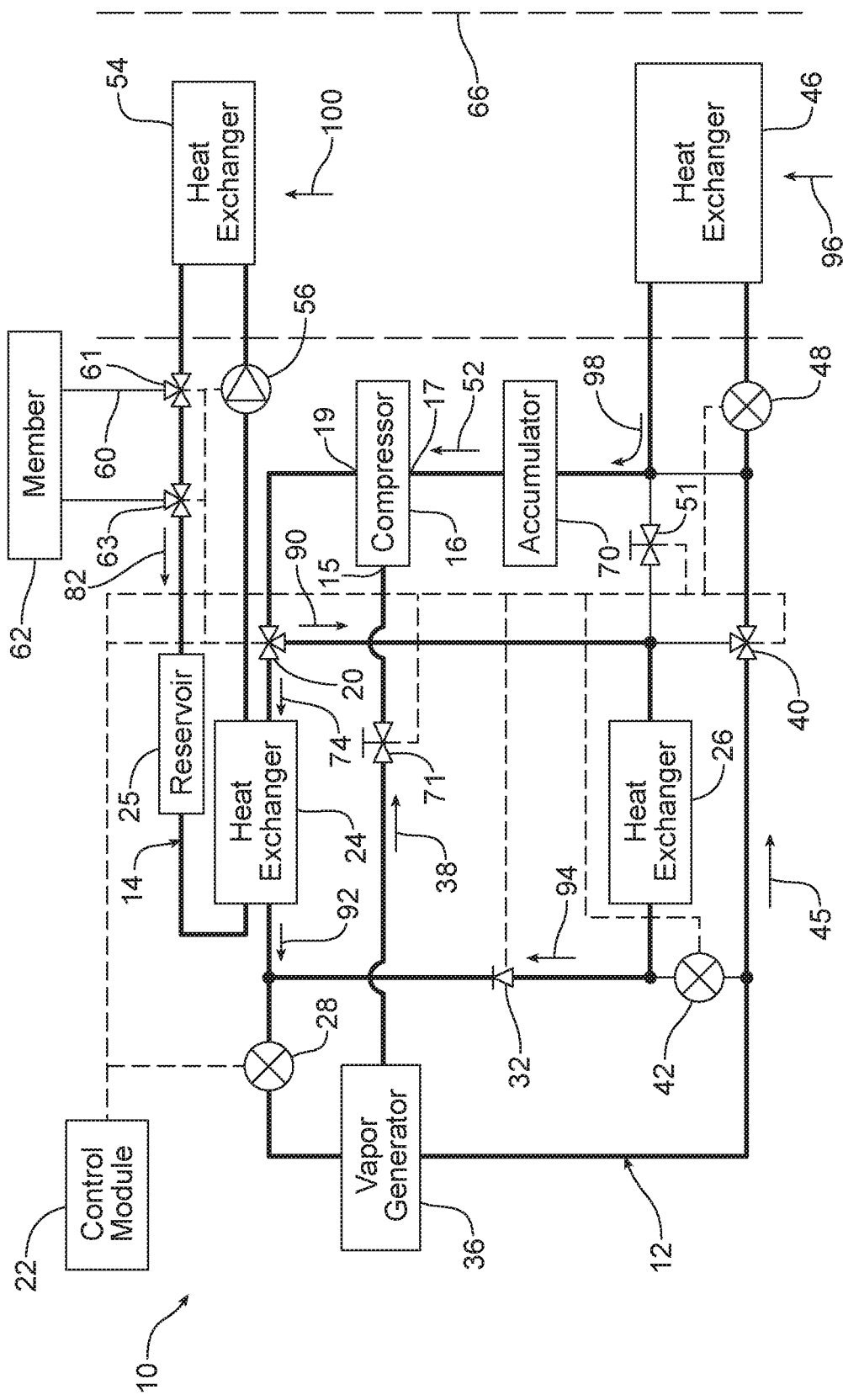
FIG. 5 is a schematic diagram of a vapor injection heat pump operating in a second reheating mode.

In a second reheating mode of operation, as shown in FIG. 5, the control module 22 again signals the valve 20 to direct the flow of the refrigerant to the first refrigerant-to-coolant heat exchanger 24 as shown by action arrow 74. In this embodiment, however, the control module 22 also signals the valve 20 to direct a portion of the flow of the refrigerant to the second air-to-refrigerant heat exchanger 26 as shown by action arrow 90. In other words, first and second portions of the flow of the refrigerant are directed to the first refrigerant-to-coolant heat exchanger 24 and the second air-to-refrigerant heat exchanger 26 respectively.

As in the above-described heating mode, the first refrigerant-to-coolant heat exchanger 24 functions to cool the first portion of the high-pressure, high-temperature vapor refrigerant discharged from the compressor 16. The cooled, high-pressure refrigerant is sent to the expansion device 28 as shown by action arrow 92. Concurrently, the second air-to-refrigerant heat exchanger 26 functions to cool the second portion of the high-pressure, high-temperature vapor refrigerant discharged from the compressor 16 due primarily to the effect of outside air as in the above-described cooling mode. The cooled, high-pressure refrigerant is then directed through the valve 32 (shown by action arrow 94) to combine with the cooled, high-pressure refrigerant exiting the first refrigerant-to-coolant heat exchanger 24 prior to entering the first expansion device 28. Within the first expansion device 28, the recombined refrigerant is expanded to become the intermediate-pressure, intermediate-temperature liquid and vapor refrigerant mixture supplied to the vapor generator 36. As described above, the vapor component of the liquid and vapor refrigerant mix is injected into the first input port 15 of the compressor 16 as shown by action arrow 38.

As in the first dehumidification and reheat mode of operation, the liquid component of the liquid and vapor refrigerant mix exiting the vapor generator 36 is directed by the valve 40, and closure of the second expansion device 42 and the third valve 51, to the third air-to-refrigerant heat exchanger 46, via the third expansion device 48. Again, the intermediate-temperature, intermediate-pressure liquid refrigerant discharged from the vapor generator 36 is expanded within the third expansion device 48 to a low-temperature, low-pressure liquid and vapor refrigerant mixture received by the third air-to-refrigerant heat exchanger 46. The second air-to-refrigerant heat exchanger 26 now receives high-temperature refrigerant vapor from the compressor 16, thereby melting frost that may accumulate on the heat exchanger surface during the heating mode of operation. The third air-to-refrigerant heat exchanger 46 functions as an evaporator and is used to cool and dehumidify the moist, warm air flowing across the third air-to-refrigerant heat exchanger as shown by action arrow 96. Within the third air-to-refrigerant heat exchanger 46, the now low-pressure, low-temperature liquid and vapor refrigerant mixture boils to vapor, or mostly vapor (with some liquid), due to the heat removed from the air and is directed to the accumulator 70 as shown by action arrow 98.

While the third air-to-refrigerant heat exchanger 46 functions to lower the humidity of the air within the passenger compartment for the comfort of the passengers or to defog one or more of the windows/windshield within the passenger compartment, the air in the passenger compartment is also cooled through this process. Again, it may be desired to reheat or warm the air in the passenger compartment to ensure the comfort of the passengers. Accordingly, in the second reheat or defrost mode of operation, warmed coolant within the coolant loop 14 is concurrently pumped through the fourth air-to-coolant heat exchanger 54.

As in the heating mode, the control module 22 directs the pump 56 to pump coolant within the coolant loop 14 through the first refrigerant-to-coolant heat exchanger 24 and the fourth air-to-coolant heat exchanger 54 which functions as a heater core within the HVAC case 66 to heat the cooled, dehumidified air and supply tempered or warm air to the passenger compartment. Cold air flowing across the fourth air-to-coolant heat exchanger 54 (as shown by arrow 100) absorbs heat from the warm coolant thereby increasing the temperature of the air. This process results in the passenger compartment having a warmer air therein.

Within the fourth air-to-coolant heat exchanger 54, the warm coolant is cooled due to the heat given to the air and directed back to the first refrigerant-to-coolant heat exchanger 24 (as shown by action arrow 82) where the cooled coolant is again warmed by absorbing heat from the refrigerant in the refrigerant loop 12, and cycled through the coolant loop 14. In the second reheat and defrost mode of operation, the auxiliary coolant loop 60 may be utilized as a supplemental heat source to further heat the coolant in the manner described above.

Again, the control module 22 controls the pump 56 and the compressor 16 and may be used to adjust or regulate the heating capacity of the fourth air-to-coolant heat exchanger 54 and, in certain embodiments, through the auxiliary coolant loop 60. In the second reheat and defrost mode of operation, varying one or both components may be utilized to adjust a heating capacity of the air-to-coolant heat exchanger 54 allowing the temperature of air flowing into the passenger compartment to be controlled without the need for a blend door or other mechanical means as described above.

Figure 6:
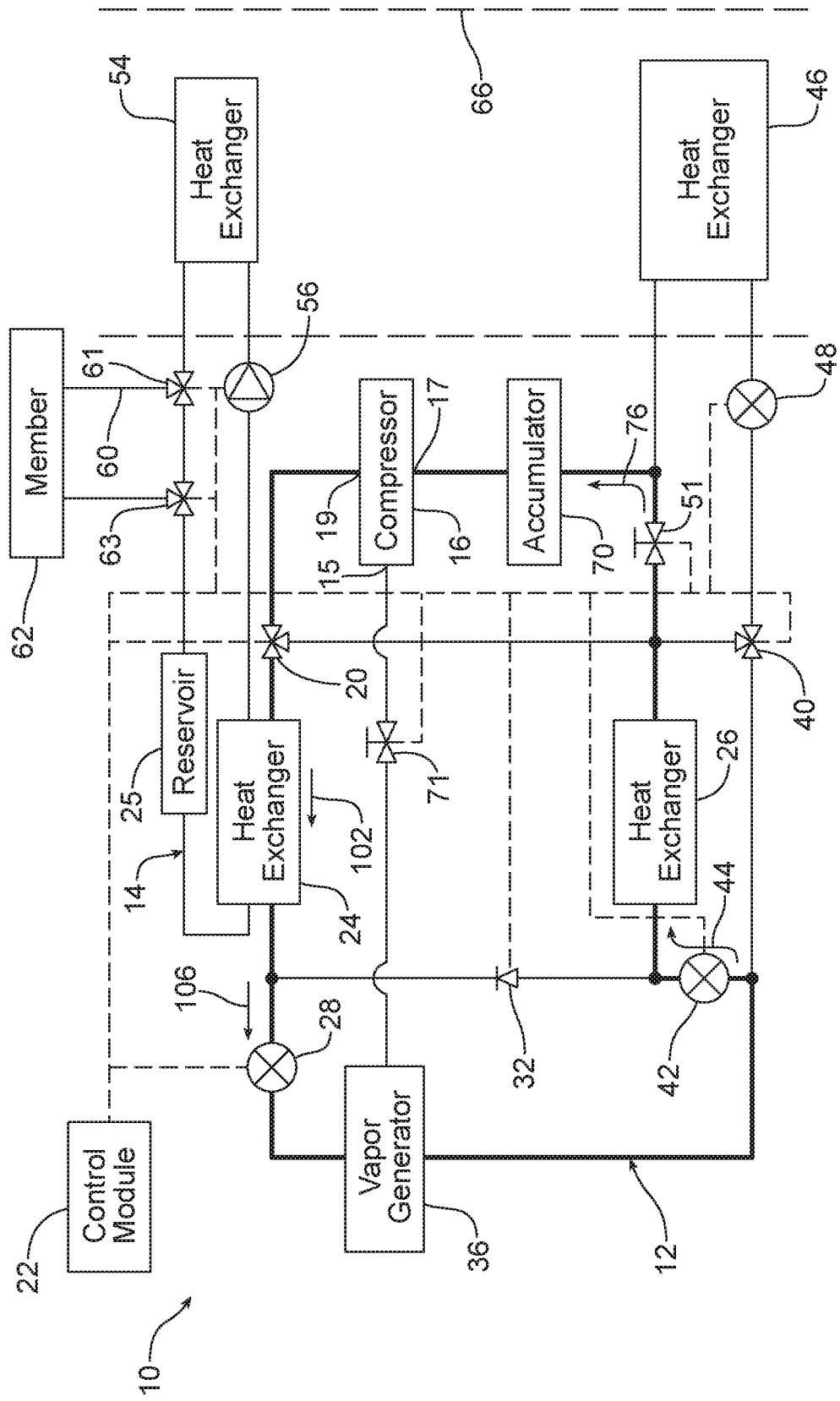
FIG. 6 is a schematic diagram of a vapor injection heat pump operating in a deicing mode.

Under certain ambient conditions, after the heat pump system operates in the heating mode for a period of time, ice or frost may build up on the first outside air-to-refrigerant heat exchanger 26, resulting in a loss or reduction in the ability of the heat pump 10 to provide heat. In such situations, the vapor injection heat pump 10 may be required to provide a deicing function. In this, a deicing mode of operation shown in FIG. 6, the control module 22 signals the valve 20 to direct the high-pressure, high-temperature vapor refrigerant discharged from the compressor 16 to the first refrigerant-to-coolant heat exchanger 24 as shown by action arrow 102. The coolant loop 14 idles to provide minimum heat exchange within the first air-to-refrigerant heat exchanger 24. The first expansion device 28 operates in an open mode and allows the high-pressure, high-temperature vapor refrigerant out of the first air-to-refrigerant heat exchanger 24 to flow through the vapor generator 36 with minimal restriction to the second expansion device 42. The second expansion device 42 operates in an expansion mode to expand the high-pressure, high-temperature vapor refrigerant into low-pressure vapor and supplies to the second air-to-refrigerant heat exchanger 26. The low-pressure vapor is cooled primarily due to the temperature of the heat exchanger itself as a result of the ice buildup, hence reducing and/or removing any ice buildup.

The cooled, low-pressure refrigerant out of the second air-to-refrigerant heat exchanger 26 is then directed through valve 51 (shown by action arrow 76) to the accumulator 70 and eventually received by the second input port 17 of the compressor 16, as shown by action arrow 52, to complete the deicing cycle. In this deicing mode, the valve 40, the valve 71, and the third expansion device 48 are closed and there is no refrigerant entering the first input port 15 of the compressor 16. Thus, the refrigerant entering the second input port 17 is simply compressed into a high-pressure, high-temperature gas refrigerant which is recirculated back through the system 10.

Figure 7:
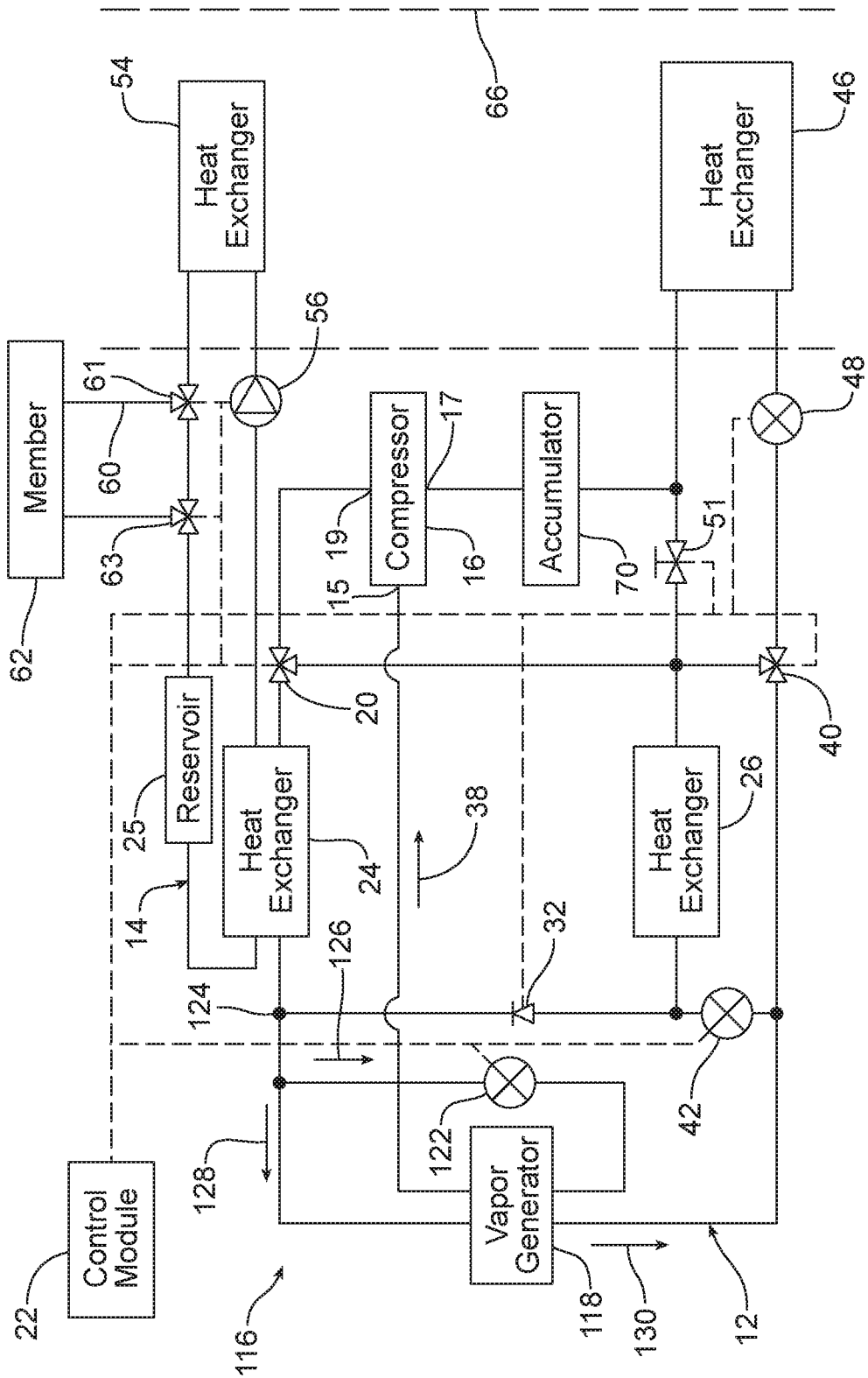
FIG. 7 is a schematic diagram of an alternate embodiment of the vapor injection heat pump wherein the separator includes a refrigerant-to-refrigerant heat exchanger.

In another embodiment of a vapor injection heat pump 116 shown in FIG. 7, the vapor generator 36 of the above-described vapor injection heat pump 10 is a fifth, refrigerant-to-refrigerant, heat exchanger 118. In this embodiment, the refrigerant-to-refrigerant heat exchanger 118 receives a first portion of the cooled, high-pressure refrigerant output by the at least one of the first refrigerant-to-coolant heat exchanger 24 and the second air-to-refrigerant heat exchanger 26 via a first expansion device 122 (shown by action arrow 126), and a second portion of the cooled, high-pressure refrigerant output by the at least one of the first refrigerant-to-coolant heat exchanger 24 and the second air-to-refrigerant heat exchanger 26 directly (shown by action arrow 128). The cooled, high-pressure refrigerant in the first portion is expanded by the first expansion device into vapor refrigerant mix to be at a lower temperature and hence absorbs heat from the cooled, high-pressure refrigerant in the second portion and becomes substantially vapor. The vapor generator then directs the vapor refrigerant in the first portion to the first input port 15 of the compressor. The remaining elements of the above-described vapor injection heat pump 10 are unchanged, as evidenced by use of the same reference numerals, and each of the various modes described above function in the same manner.

Within the refrigerant-to-refrigerant heat exchanger 118, the now intermediate-pressure, intermediate-temperature first portion of the liquid and vapor refrigerant mixture after the first expansion device 122 boils to a vapor due to the heat removed from the second portion of refrigerant passing through the refrigerant-to-refrigerant heat exchanger 118. The now substantially vapor refrigerant exiting the refrigerant-to-refrigerant heat exchanger 118 is injected into the first input port 15 of the compressor 16 as shown by action arrow 38. The second portion of the refrigerant is now a further-cooled, high-pressure liquid, or substantially liquid, refrigerant exiting the refrigerant-to-refrigerant heat exchanger 118 as shown by action arrow 130. As suggested above, the substantially liquid refrigerant is directed to one or more of the second air-to-refrigerant heat exchanger 26, the accumulator 70, and the third air-to-refrigerant heat exchanger 46, dependent upon the mode of operation.

Whether the cooled, high-pressure refrigerant passing through node 124 comes from the first refrigerant-to-coolant heat exchanger 24 in a heating or reheating mode of operation, the second air-to-refrigerant heat exchanger 26 in a cooling mode of operation, or both the first refrigerant-to-coolant heat exchanger 24 and the second air-to-refrigerant heat exchanger 26 in another reheating mode of operation, the fifth refrigerant-to-refrigerant heat exchanger 118 functions to direct a first component, including a substantially vapor refrigerant, to the first input port 15 of the compressor 16 and a second component, including a substantially liquid refrigerant, downstream to one or more of the second air-to-refrigerant heat exchanger 26, the accumulator 70, and the third air-to-refrigerant heat exchanger 46 dependent upon the mode of operation. As indicated above, other than the utilization of the refrigerant-to-refrigerant heat exchanger as a vapor generator, the vapor injection heat pump 116 functions the same as the above-described vapor injection heat pump 10 in all modes of operation.

The foregoing has been presented for purposes of illustration and description. It is not intended to be exhaustive or to limit the embodiments to the precise form disclosed. Obvious modifications and variations are possible in light of the above teachings. For example, the valves utilized in the heat pump can be different types of valves and/or combinations of different types of valves. In the described embodiment, for example, the valves 20 and 40 are three-way valves which could be replaced in alternate embodiments by a series of one-way and/or two-way valves sufficient to direct the refrigerant flows in desired directions dependent upon the mode of operation. Again, the valves receive signals from and are controlled by the control module 22. The varying directions the valves direct the refrigerant flows are described in more detail for the various modes of operation above.

In still other embodiments, a vapor injection heat pump 132 may include a plurality of check valves. In this embodiment, the control module 22 controls each of the check valves to direct refrigerant through the refrigerant loop 12 depending upon the mode of operation. It should be noted that each check valve is in a normally closed state. In other words, absent a signal from the control module 22, the check valves will not allow refrigerant to flow through them. When a check valve is in an activated state, the check valve only allows refrigerant to flow in a single, designated direction.

Figure 8:
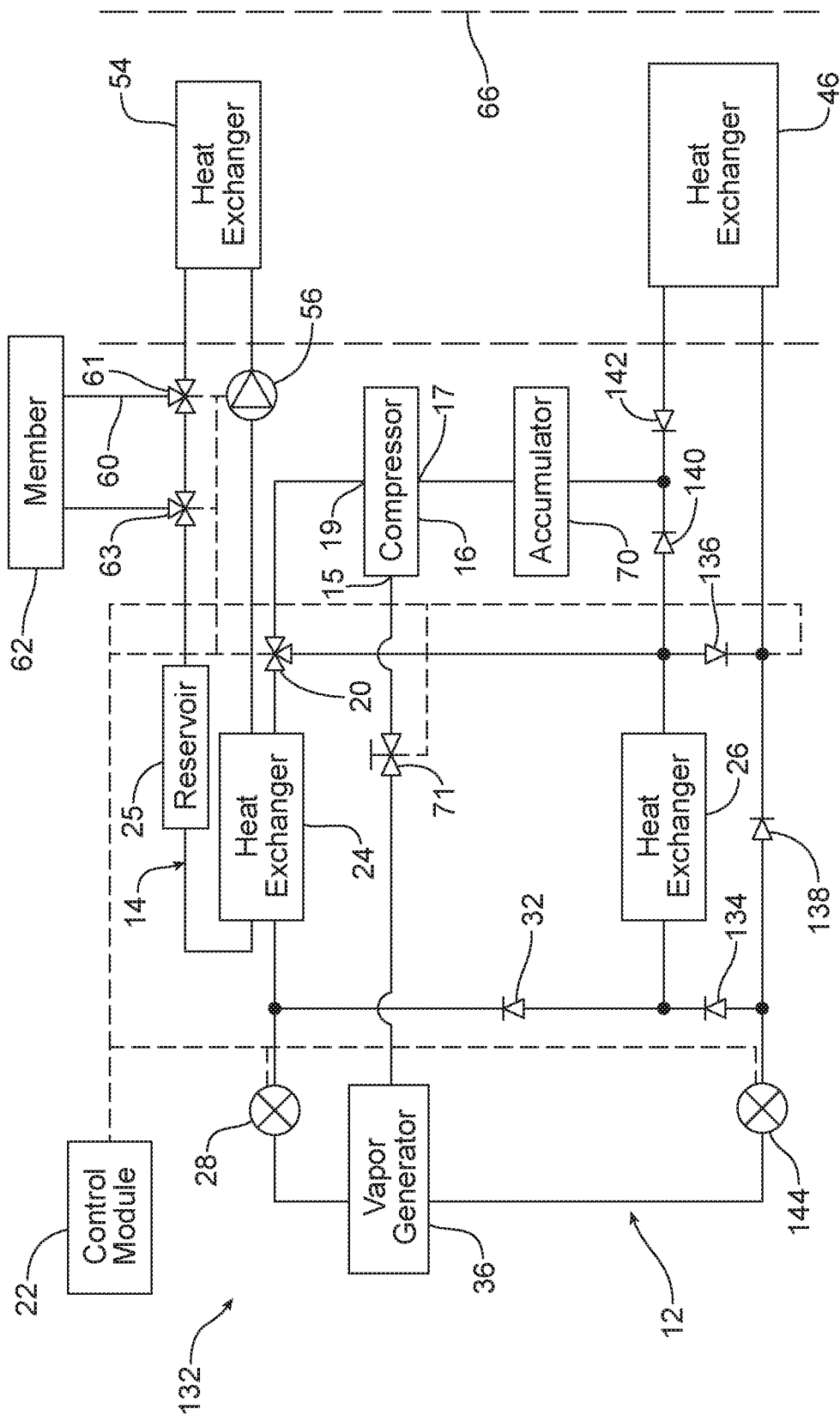
FIG. 8 is a schematic diagram of an alternate embodiment of the vapor injection heat pump wherein a plurality of check valves is utilized.

In this embodiment, shown in FIG. 8, the second valve 40 depicted as a three-way valve in previous embodiments, is replaced with second, third, and fourth check valves 134, 136, and 138, respectively, for controlling refrigerant flow to the second air-to-refrigerant heat exchanger 26. In addition, the second expansion device 42 is renumbered 144 and moved upstream such that the liquid refrigerant component exiting the vapor generator 36 always passes through the second expansion device 144. This allows the third expansion device 48 to be eliminated, and the two-way stop valve 51 is replaced with fifth and sixth check valves 140 and 142. Otherwise, the vapor injection heat pump 132 is the same as the above-described vapor injection heat pump 10 in all modes of operation.

In operation, first, second, and third check valves 32, 134, and 136 are utilized to direct the high-pressure, high-temperature refrigerant directed by valve 20 toward the second air-to-coolant heat exchanger 26, in the cooling and second reheating modes of operation, through the second air-to-refrigerant heat exchanger to the first expansion device 28. In addition, the expanded low-pressure, low-temperature refrigerant exiting the second expansion device 144 is directed by a combination of second, third, and fourth check valves 134, 136, and/or 138 through the second air-to-refrigerant heat exchanger 26 in a heating mode of operation. In the cooling and second reheating modes of operation, the low-pressure, low-temperature refrigerant is directed by check valves 140 and 142 through the third air-to-refrigerant heat exchanger 46 to the compressor 16. The check valves 140 and 142 are further and similarly utilized in the heating mode of operation to direct low-pressure, low-temperature refrigerant exiting the second air-to-refrigerant heat exchanger 26 to the compressor 16. Even more, in a deicing mode of operation, the first check valve 32 remains deactivated and the valve 71 is closed to allow the high-pressure, high-temperature refrigerant, directed by valve 20, to flow toward the second expansion device 144. Again, the coolant loop 14 idles and the first expansion device 28 operates in an open mode. The second expansion device 144 operates in an expansion mode to expand the high-pressure, high-temperature vapor refrigerant into low-pressure vapor refrigerant and supplies to the second air-to-refrigerant heat exchanger 26 through activation of the check valves 134, 140. The low-pressure vapor refrigerant is cooled primarily due to the temperature of the heat exchanger itself as a result of the ice buildup, hence reducing and/or removing any ice buildup.

Figure 9:
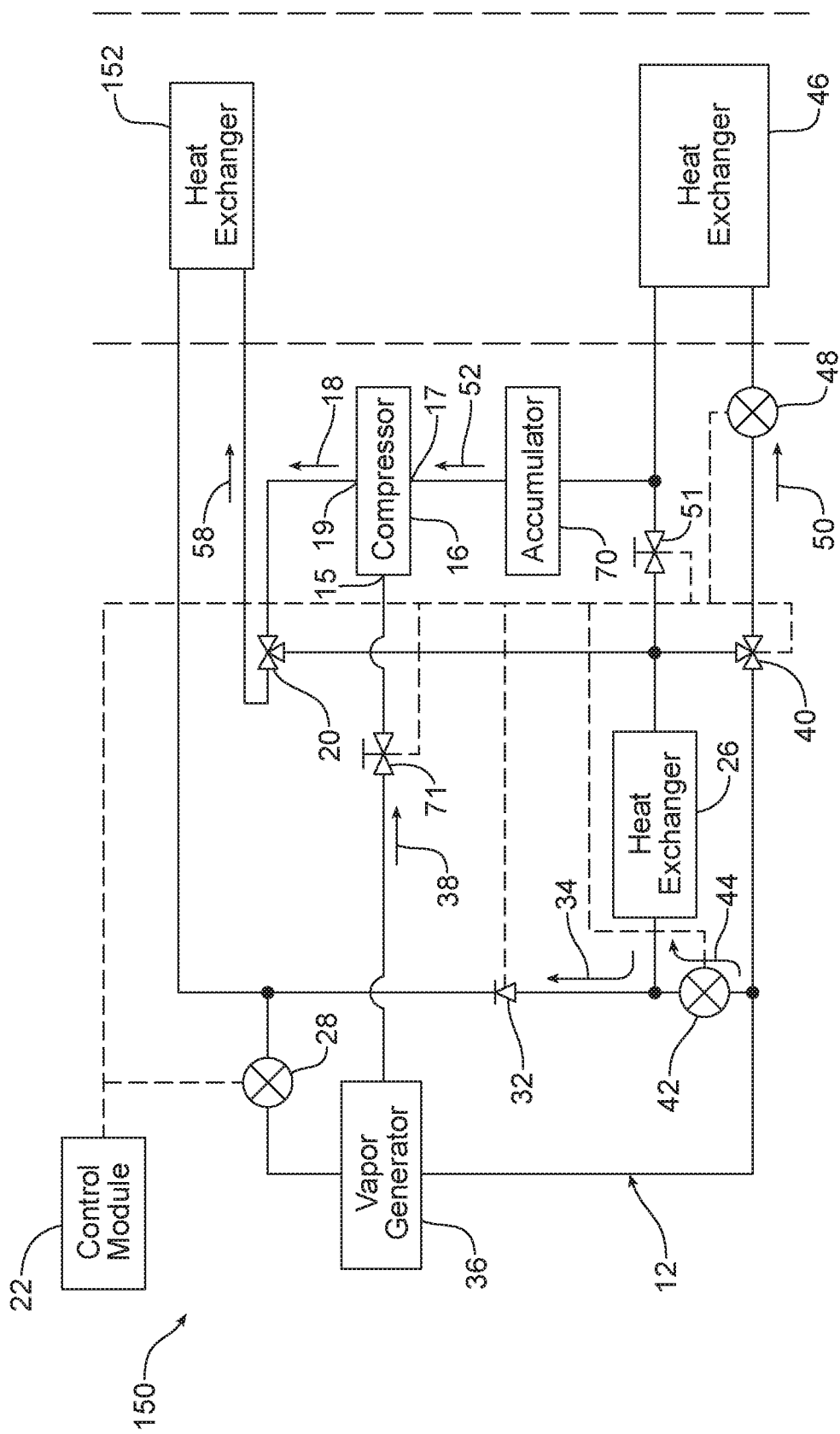
FIG. 9 is a schematic diagram of an alternate embodiment of a vapor injection heat pump utilizing a refrigerant-to-air heat exchanger for heating.

One additional alternate embodiment of a vapor injection heat pump 150 is shown in FIG. 9. In this embodiment, compared to the vapor injection heat pump 10, the coolant loop 14 and attendant first, coolant-to-refrigerant, heat exchanger 24, pump 56, and the auxiliary loop 60 are removed, and the fourth, coolant-to-air, heat exchanger 54 is replaced with a first, refrigerant-to-air, heat exchanger 152. Instead, the first valve 20 directs the refrigerant output by the compressor 16 through the first air-to-refrigerant heat exchanger 152 and/or the second air-to-coolant heat exchanger 26, dependent upon the mode of operation, to the first expansion device 28 in all modes of operation. As will be described in more detail below, the first air-to-refrigerant heat exchanger 152 may function as a condenser or be idle depending on the mode of operation.

In the expansion device 28, the cooled, high-pressure refrigerant from the first air-to-refrigerant heat exchanger 152 and/or the second air-to-refrigerant heat exchanger 26 is expanded in all but a deicing mode of operation (described in detail below). More specifically, the refrigerant is expanded to become an intermediate-pressure, intermediate-temperature liquid and vapor refrigerant mixture which is supplied to a vapor generator 36. The vapor generator 36 directs, or injects, a vapor component of the liquid and vapor refrigerant mix to the first input port 15 (or intermediate-pressure input port) of the compressor 16 as shown by action arrow 38. In the described embodiment, the control module 22 is electrically connected to the expansion device 28 (as shown by dashed line) and operates to control a size of the opening within the expansion device which determines the drop in pressure of the refrigerant moving through the device.

The liquid component of the liquid and vapor refrigerant mix exiting the vapor generator 36 is directed by a second expansion device 42, a second valve 40, and a third valve 51 to the second air-to-refrigerant heat exchanger 26 via, as shown by action arrow 44, or to a third air-to-refrigerant heat exchanger 46 via the second valve 40, and a third expansion device 48, as shown by action arrow 50, dependent upon the mode of operation. In the described embodiment, the valve 40 is a three-way valve (two inputs and one output) electrically connected to the control module 22 as shown by dashed line.

An accumulator 70 receives low-pressure, low-temperature, mostly vapor, refrigerant exiting the second air-to-refrigerant heat exchanger 26, via the valve 51, or the third air-to-refrigerant heat exchanger 46, via the valve 40, or both the second air-to-refrigerant heat exchanger 26 and the third air-to-refrigerant heat exchanger 46, depending on the mode of operation. The accumulator 70 functions to store excessive refrigerant and oil and provide only vapor refrigerant to the compressor 16. In the described embodiment, the accumulator 70 provides substantially vapor refrigerant to the second input port 17 (or low-pressure input port) of the compressor 16 as shown by action arrow 52. As described above, the refrigerant entering the second input port 17 is compressed in the low-pressure stage, combined with the refrigerant entering the first input port, and compressed in the intermediate-pressure stage into the high-pressure, high-temperature gas refrigerant.

As further shown in FIG. 9, the control module 22 is electrically connected to components within the vapor injection heat pump 150 (as shown by dashed lines) in addition to the first valve 20, the second valve 40, the third valve 51, and the first expansion device 28, the second expansion device 42, and the third expansion device 48. One such component is the compressor 16. In the described embodiment, the compressor 16 is an electric, multi-port compressor driven by a variable speed motor (not shown) and the control module 22 adjusts a speed of the motor. Other embodiments may utilize fixed or variable displacement compressors driven by a compressor clutch which in turn is driven by an engine of the vehicle.

All such modifications and variations are within the scope of the appended claims when interpreted in accordance with the breadth to which they are fairly, legally and equitably entitled.

What is claimed:

1. A vapor injection heat pump, comprising:
   a compressor for compressing a refrigerant that includes at least a first input port, a second input port, and an output port;
   a first valve directing at least one of a first portion of the refrigerant output by said compressor to a first heat exchanger and a second portion of the refrigerant output by said compressor to a second heat exchanger dependent upon a mode of operation;
   a first expansion device receiving at least one of the first portion of the refrigerant directed through said first heat exchanger and the second portion of the refrigerant directed through said second heat exchanger;
   a vapor generator receiving a liquid and vapor refrigerant mix from said first expansion device and directing a vapor component of the liquid and vapor refrigerant mix to said first input port of said compressor and a liquid component of the liquid and vapor refrigerant mix to at least one of said second heat exchanger and a third heat exchanger, via controlling a second valve, dependent upon the mode of operation, wherein said second input port of said compressor receives an output refrigerant from at least one of said second heat exchanger and said third heat exchanger dependent upon the mode of operation;
   a second expansion device downstream of said vapor generator;
   a third expansion device upstream of said third heat exchanger;
   a third valve opening or closing flow of the refrigerant dependent upon the mode of operation, and
   a control module for controlling at least said first, second and third valves and said first, second and third expansion devices dependent upon the mode of operation.

2. The vapor injection heat pump of claim 1, further comprising an accumulator upstream of said second input port of said compressor receiving the refrigerant output by at least one of said second heat exchanger and said third heat exchanger dependent upon the mode of operation and directing substantially the vapor component of the refrigerant output by at least one of said second heat exchanger and said third heat exchanger to said second input port of said compressor.

3. The vapor injection heat pump of claim 2, wherein said first valve directs the refrigerant output by said compressor to said first heat exchanger, said control module operates said first expansion device in an open mode providing minimal refrigerant flow restriction and said second expansion device in an expansion mode lowering pressure and temperature of the refrigerant flow, said control module further closes said second valve and third expansion device, and opens said third valve, said second heat exchanger receives an expanded refrigerant flow out of said second expansion device and absorbs heat, and said third valve directs cooled refrigerant out of said second heat exchanger to said accumulator and eventually to said second input port of said compressor where the refrigerant is compressed to high-temperature, high-pressure vapor, in a deicing mode of operation.

4. The vapor injection heat pump of claim 2, wherein said first heat exchanger is a refrigerant-to-coolant heat exchanger.

5. The vapor injection heat pump of claim 4, further comprising a coolant loop including said first heat exchanger and a fourth air-to-coolant heat exchanger through which a coolant is pumped dependent upon the mode of operation.

6. The vapor injection heat pump of claim 5, further comprising a refrigerant loop including said compressor, said first valve, said second heat exchanger, said first expansion device, said vapor generator, said second valve, said second expansion device, said third expansion device, said third valve, and said third heat exchanger.

7. The vapor injection heat pump of claim 6, wherein said first valve directs the refrigerant output by said compressor to said second heat exchanger and said second valve directs the liquid component of the liquid and vapor refrigerant mix to said third heat exchanger, in a cooling mode of operation.

8. The vapor injection heat pump of claim 6, wherein said first valve directs the refrigerant output by said compressor to said first heat exchanger, said second valve closes and said third valve opens to allow the liquid component of the liquid and vapor refrigerant mix to said second heat exchanger, and said pump pumps coolant through said first refrigerant-to-coolant heat exchanger and said fourth air-to-coolant heat exchanger within said coolant loop, in a heating mode of operation.

9. The vapor injection heat pump of claim 6, wherein said first valve directs the refrigerant output by said compressor to said first heat exchanger, said second valve directs the liquid component of the liquid and vapor refrigerant mix first to said second heat exchanger, via said second expansion device, and then to said third heat exchanger, via said third expansion device, and said pump pumps coolant through said first refrigerant-to-coolant heat exchanger and said fourth air-to-coolant heat exchanger within said coolant loop, in a first reheating mode of operation.

10. The vapor injection heat pump of claim 6, wherein said first valve directs the refrigerant output by said compressor to both said first heat exchanger and said second heat exchanger, said second valve directs the liquid component of the liquid and vapor refrigerant mix to said third heat exchanger, via said third expansion device, and said pump pumps coolant through said first refrigerant-to-coolant heat exchanger and said fourth air-to-coolant heat exchanger within said coolant loop, in a second reheating mode of operation.

11. The vapor injection heat pump of claim 6, wherein said first valve directs the refrigerant output by said compressor to said first heat exchanger, said control module operates said first expansion device in an open mode providing minimal refrigerant flow restriction and said second expansion device in an expansion mode lowering pressure and temperature of the refrigerant flow, said control module further closes said second valve, said third expansion device, and opens said third valve, said second heat exchanger receives the expanded refrigerant flow and absorbs heat, and said third valve directs the cooled refrigerant out of said second heat exchanger to said accumulator and eventually to said second input port of said compressor where the refrigerant is compressed to high-temperature, high-pressure vapor, in a deicing mode of operation.

12. The vapor injection heat pump of claim 1, further comprising a fourth valve between said vapor generator and said first input port of said compressor opening or closing the refrigerant flow into said first input port of said compressor.

13. The vapor injection heat pump of claim 1, wherein said first, second, and third heat exchangers are air-to-refrigerant heat exchangers.

14. The vapor injection heat pump of claim 1, wherein said first valve directs the refrigerant output by said compressor to said second heat exchanger, and said second valve directs the liquid component of the liquid and vapor refrigerant mix to said third heat exchanger, in a cooling mode of operation.

15. The vapor injection heat pump of claim 1, wherein said first valve directs the refrigerant output by said compressor to said first heat exchanger, and said second valve closes and said third valve opens to allow the liquid component of the liquid and vapor refrigerant mix to said second heat exchanger via said second expansion device, in a heating mode of operation.

16. The vapor injection heat pump of claim 1, wherein said first valve directs the refrigerant output by said compressor to said first heat exchanger, and said second valve directs the liquid component of the liquid and vapor refrigerant mix first to said second heat exchanger, via said second expansion device, and then to said third heat exchanger, via said third expansion device, in a first reheating mode of operation.

17. The vapor injection heat pump of claim 1, wherein said first valve directs the refrigerant output by said compressor to both said first heat exchanger and said second heat exchanger, and said second valve directs the liquid component of the liquid and vapor refrigerant mix to said third heat exchanger, via said third expansion device, in a second reheating mode of operation.

18. The vapor injection heat pump of claim 1, wherein said vapor generator is a separator.

19. The vapor injection heat pump of claim 1, wherein said vapor generator is a refrigerant-to-refrigerant heat exchanger, said refrigerant-to-refrigerant heat exchanger receiving (1) a first portion of the refrigerant output by the at least one of said first heat exchanger and said second heat exchanger and expanded within said first expansion device to the liquid and vapor refrigerant mix and (2) a second portion of the refrigerant output by the at least one of said first heat exchanger and said second heat exchanger dependent upon the mode of operation, wherein liquid and vapor refrigerant mix in the first portion is at a lower temperature due to expansion in said first expansion device, absorbs heat from the refrigerant in the second portion, becomes substantially vapor, and is directed to said first input port of the compressor.

20. A vapor injection heat pump, comprising:
a compressor for compressing a refrigerant that includes at least a first input port, a second input port, and an output port;
a first valve directing the refrigerant output by said compressor, said first valve directing the refrigerant to (1) a first heat exchanger in a heating mode of operation, a first reheating mode of operation, and a deicing mode of operation, to (2) a second heat exchanger in a cooling mode of operation, and to (3) both said first and said second heat exchangers in a second reheating mode of operation;

a first expansion device receiving the refrigerant directed through said first heat exchanger in the heating mode of operation, the first reheating mode of operation, and the deicing mode of operation, and the refrigerant directed through said second heat exchanger in the cooling mode of operation;

a vapor generator receiving a liquid and vapor refrigerant mix from said first expansion device and directing a vapor component of the liquid and vapor refrigerant mix to said first input port of said compressor and a liquid component of the liquid and vapor refrigerant mix to at least one of said second heat exchanger and a third heat exchanger, via controlling a second valve, dependent upon the mode of operation, wherein said second input of said compressor receives an output refrigerant from at least one of said second heat exchanger and said third heat exchanger dependent upon the mode of operation;

a second expansion device downstream of said vapor generator;

a third expansion device upstream of said third heat exchanger;

a third valve opening or closing the refrigerant flow dependent upon the mode of operation; and a control module for controlling at least said first, second, and third valves, and said first, second, and third expansion devices dependent upon the mode of operation.

* * * * *